Jan. 26, 1932.　　　　G. L. MILLER　　　　1,842,835
GOVERNOR COUPLING DEVICE
Filed Sept. 20, 1929　　　2 Sheets-Sheet 1

Inventor:
George L. Miller
By: Wallace R. Lane, Atty.

Jan. 26, 1932.  G. L. MILLER  1,842,835

GOVERNOR COUPLING DEVICE

Filed Sept. 20, 1929  2 Sheets-Sheet 2

Inventor;
George L. Miller
By Wallace R. Lane Atty.

Patented Jan. 26, 1932

1,842,835

UNITED STATES PATENT OFFICE

GEORGE L. MILLER, OF NEWTON, IOWA, ASSIGNOR TO THE MAYTAG COMPANY, OF NEWTON, IOWA, A CORPORATION OF DELAWARE

GOVERNOR COUPLING DEVICE

Application filed September 20, 1929. Serial No. 393,859.

The present invention relates to governor devices and more in particular to governor devices adapted to be connected to rotary members for the transmitting of motion from one rotary member to another.

Among the objects of the invention is to provide a novel governor device adapted to be mounted upon a rotary member and to effect a driving connection between this member and another when a certain predetermined or given speed has been attained.

In certain mechanisms, such as electrical motors or the like, it is necessary to allow the motor or mechanism to attain a certain speed before it be operatively connected to the load under which it is to operate. To immediately connect such a mechanism or motor with the load would cause fluctuations in the power line resulting in the burning out of fuses or the like, as likewise to cause an overheating of the armature and stator windings with the possibility of burning the same.

It is therefore an object of the present invention to provide a novel governor device adapted for use with such a motor or the like which will allow the motor to attain its driving or normal operating speed with the consumption of a minimum of electrical energy and without danger of causing injury to the windings or fluctuation of current in the power line.

Another object of the invention is to provide a novel governor device adapted to be connected to a rotary member driven by a motor or the like, the governor normally being disengaged from the member driven by the rotary member but adapted, when the motor has attained its normal operating speed, to automatically effect a connection between these members for the transmission of power.

The invention comprehends the idea of providing novel governor means for connection to a pulley or the like driven by the motor, the pulley and governor mechanism adapted to be readily replaced, parts repaired and adjusted or substituted without the inconvenience met with if the governor were operatively connected to the motor or other like mechanism.

The invention further comprehends the idea of providing a pulley having novel governor mechanism associated therewith, the various parts of which are readily assembled for easy attachment as likewise are adapted for quantity production.

A feature of the invention is to provide a novel cam member mounted upon the shaft to be driven by the motor or the like, the cam member having a portion thereof adapted to be engaged by the governor connected to a rotary member mounted on the shaft, for transmitting motion of the rotary member to the shaft.

Another feature of the invention is to provide a novel governor pivotally connected to the rotary member, the governor being provided with an arm adapted to engage and transmit power to the cam member and shaft upon which it is mounted, when the other arm of the governor is thrown outwardly by centrifugal force when a given speed of the rotary member and the motor to which it is operatively connected is attained.

Novel means are provided in the form of a stop adapted to limit the movement of the engaging arm of the governor when a given speed has been attained, as likwise to prevent contact of the other arm of the governor with the cam member when the speed of the motor and the rotary member operatively connected thereto has been diminished.

The invention also comprehends other objects, advantages, capabilities and features as will later appear, and are inherently possessed thereby.

Referring to the drawings.

Figure 2:
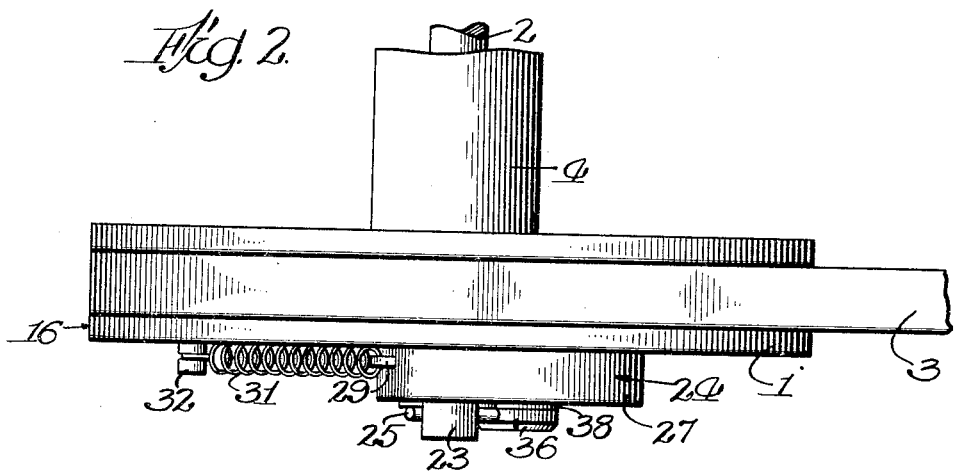
Fig. 2 is a top plan view of the embodiment selected to illustrate the invention and as shown in Fig. 1 of the drawings.
Figure 1:
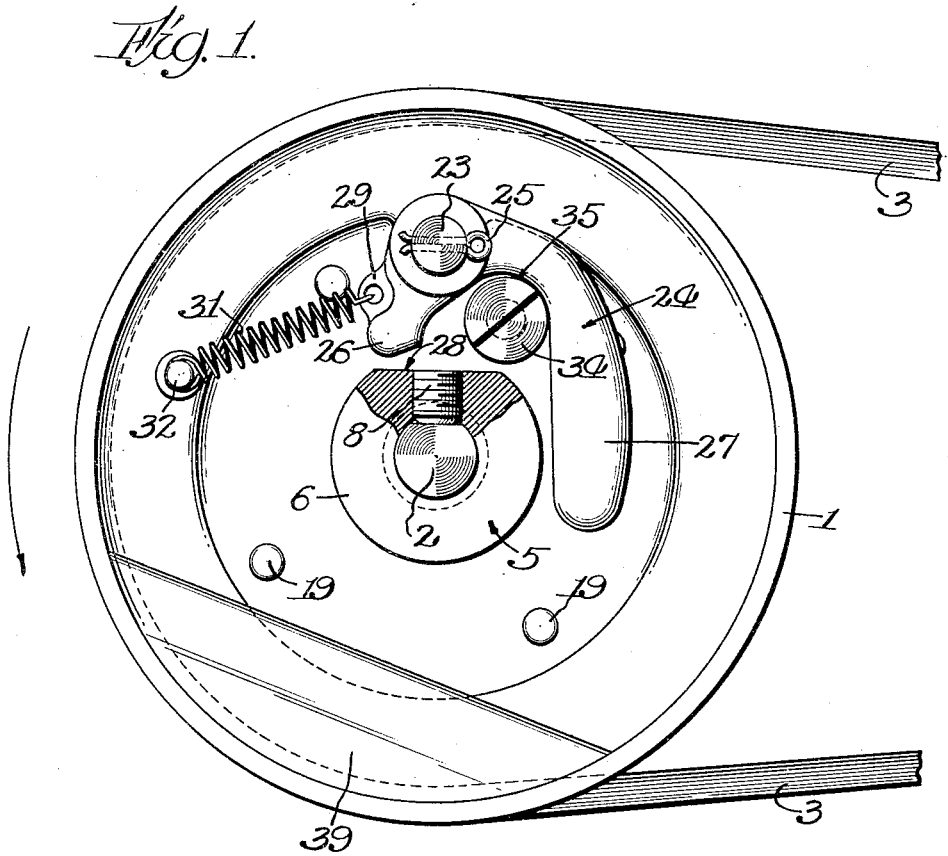
Fig. 1 is a view in side elevation of a rotary member operatively connected to a motor or the like and having connected thereto a novel governor means, this governor being in a disengaged position.
Figure 3:
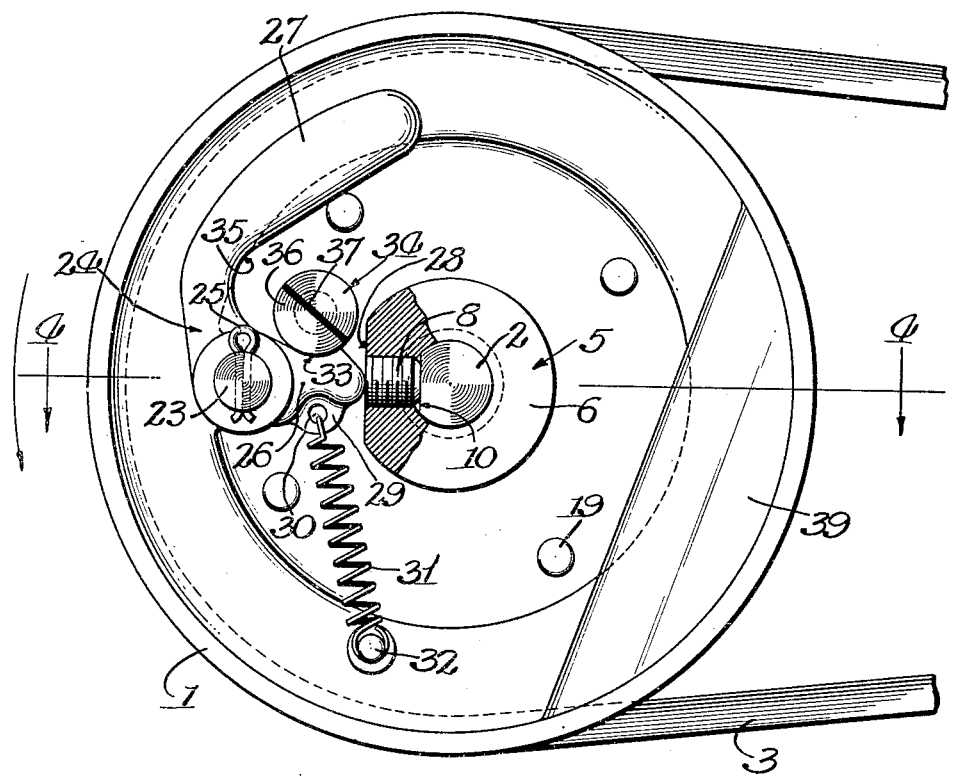
Fig. 3 is a view in side elevation of the embodiment selected to illustrate the invention and disclosing the governor means in engaged position with the cam member for driving the same and the shaft to which it is connected.
Figure 4:
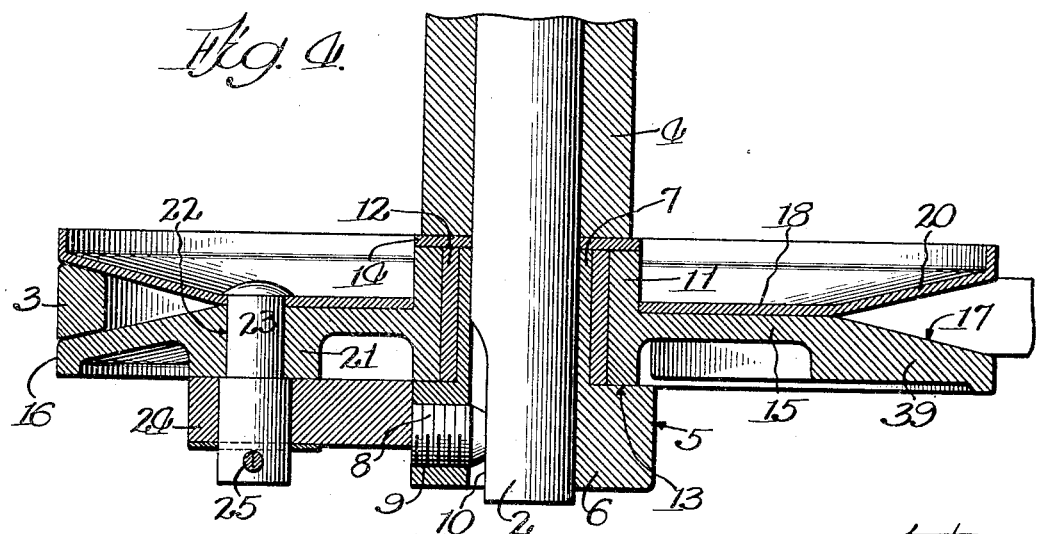
Fig. 4 is a horizontal cross sectional view taken in the plane represented by the line 4—4 of Fig. 3.

Referring now more in detail, to the drawings, the embodiment selected to illustrate the invention is shown as being connected to a sheave pulley 1 mounted about a shaft 2 operatively connected and driven by a belt 3 passing therearound, the other end of this belt passing around a pulley connected to a motor (not shown).

The shaft 2 is mounted in suitable bearings (not shown) and is connected to a mechanism which is to be driven by the motor, the end portion of this shaft being enclosed within the housing 4. Mounted upon the end of the shaft is a cam member 5 having a hub 6 and an extended tubular sleeve portion 7. The cam member is held in place upon the shaft by a set screw 8 or the like engaging the internal threaded bore 9 in the hub 6, the end of the set screw being adapted to contact the surface of a flat portion 10 at the end of the shaft and to prevent rotation of the member on the shaft.

The pulley 1 is provided with a hub 11 having pressed within the bore thereof a tubular sleeve or bushing 12, the pulley being adapted to be rotatably mounted on the tubular sleeve of the cam member. One end of the hub 11 contacts the shoulders 13 of the cam member, while the other end is in contact with a washer 14 in contact with the end of the housing or casing for taking up the end thrust of the pulley 1 and to prevent wearing of the end of the housing were the hub in immediate contact therewith.

The hub 11 of the pulley 1 has integrally formed therewith the annular web portion 15, the periphery 16 of which is provided with an inside bevelled surface 17. An annular back plate 18 is provided and is adapted to fit over the hub 11 and is connected to the web 15 of the front portion of the pulley by such means as rivets 19 or the like, and has a bevelled portion 20 adjacent to its periphery corresponding with the bevelled portion 17 and forming therewith an annular wedge-shaped groove for the belt 3. The front plate of the pulley is provided with a boss 21 having a bore 22 extending therethrough and through the web of the back plate 18 of the pulley through which extends a pin 23 and having pivotally mounted on its outer end a governor, centrifugal arm or pawl 24, a cotter pin 25 or the like passing through the pin and contacting the governor for preventing the same from becoming detached from the pin 23.

The governor 24 is provided with arms 26 and 27, the shorter arm 26 of which being adapted to contact and engage the flat portion or surface 28 when the arm 27 is thrown or cast outwardly by centrifugal force when a predetermined speed of the pulley 1 has been attained. The arm 26 is provided with a webbed portion 29 having therein an aperture 30 for the connection of a spring 31, the other end of the spring being connected to a knob or protuberance 32 on the front plate of the pulley. Such resilient means are provided in order that the arm 26 will not engage the cam member 5 until such time as the arm 27, because of centrifugal force, has overcome the effect thereof. Any spring or other means and of any degree of resilience may be provided for determining at what speed of the pulley the arm 27 will be thrown outwardly to effect an engagement of the arm 26 with the cam member 5 and to drive the same and the shaft 2. This spring likewise acts to disengage the arm 26 from the cam member when the speed of the pulley is decreased.

The arm 26 is provided with a curved surface 33 adapted to contact stop means 34 for limiting the amount of engagement of the arm 26 with the cam member 5, as likewise to limit the outward movement of the arm 27 of the governor, while the arm 27 is provided with a similar curved portion 35 adapted to contact the same stop means for preventing contact of the arm 27 with the cam member 5 when the speed of the pulley has been decreased and the movement of this arm is inwardly toward the axis of rotation.

This stop means 34 comprises a bolt having a cylindrical head 36 with a screw slot 37, this bolt passing through a bolt hole in a boss or projection 38 in the front plate of the pulley, the threaded end of the bolt protruding through an aperture in the back plate of the pulley and being engaged by a nut thereon.

In order to offset the unbalanced condition which would exist when the pulley is operating at high speed and at which time the governor arm 27 would be in its most outwardly position, counterbalancing or compensating means are provided. Substantially opposite to the governor 24, the periphery of the front plate of the pulley is constructed of somewhat greater thickness as at 39 to provide sufficient weight for equalizing the effect of the centrifugally throwing out of the arm 27 of the governor. With such means provided, the pulley will operate smoothly and will not cause undue strain and stress on the various parts, as likewise uneven wearing thereof.

In operation, the motor (not shown), operatively connected by means of the belt to the pulley, is thrown into an electrical circuit for the starting thereof. Inasmuch as the pulley is rotatable on the shaft 2, the motor is free from any appreciable load and can easily attain its operating speed. Since no load is on the motor, fluctuations in the power line are substantially minimized and there is no danger of causing overheating of the armature and stator windings. When the motor has attained its predetermined speed, the governor arm 27 is caused to be thrown outwardly as likewise at the same time the arm 26 comes into contact and engages the surface 28 for effecting a drive by way of the pulley to the cam member 5 and shaft 2 and the mechanisms connected to the shaft. When the speed of the pulley is decreased, the arm 26 is disengaged from the cam surface 28 of the cam member and the pulley 1 idles or inoperatively rotates about the shaft 2. If there is an overloading of the mechanism to which the shaft 2 is connected, the speed of the pulley is decreased, the governor is disengaged from the cam member, and the pulley again rotates idly on the shaft 2. Thus, the harmful effects of overloading the motor are substantially eliminated and made foolproof by the provision of such automatic means.

While I have herein described and upon the drawings illustrated an embodiment of the invention, it is to be understood that the latter is not limited thereto, but comprehends other details, arrangements of parts, features and constructions without departing from the spirit thereof.

Having thus disclosed the invention, I claim:

1. A governor coupling device for transmission of power, comprising a shaft, a pulley rotatably mounted thereon, a cam member mounted on said shaft, a governor having arms, one of said arms adapted to engage said cam member for driving said shaft when the other of said arms is thrown out by centrifugal force, means associated with said engaging arm adapted to regulate the extent of movement of said governor, and resilient means for disengaging said governor when the speed of the pulley is decreased.

2. A governor coupling device for transmission of power, comprising a shaft, a cam member mounted on said shaft, said member having a hub and a tubular sleeve portion, said hub having a flat portion, a pulley rotatably mounted on said sleeve portion, and a governor adapted to engage the flat portion of said cam member for driving said shaft when the pulley has atained a given speed.

3. A governor coupling device for transmission of power, comprising a shaft, a cam member mounted on said shaft, said member having a hub and a tubular sleeve portion, said hub having a flat portion, a pulley rotatably mounted on said sleeve portion, a governor adapted to engage the flat portion of said cam member for driving said shaft when the pulley has attained a given speed, and means for disengaging said governor when the speed of the pulley is decreased.

4. A governor coupling device for transmission of power, comprising a shaft, a cam member mounted on said shaft, said member having a hub and a tubular sleeve portion, said hub having a flat portion, a pulley rotatably mounted on said sleeve portion, a governor adapted to engage the flat portion of said cam member for driving said shaft when the pulley has attained a given speed, means for disengaging said governor, and means preventing contact of said governor with said hub when the speed of the pulley is decreased.

5. A governor coupling device for transmission of power, comprising a shaft, a cam member mounted on said shaft, said member having a hub and a tubular sleeve portion, said hub having a flat portion, a pulley rotatably mounted on said sleeve portion, a governor pivotally connected to said pulley, said governor having arms, one of said arms adapted to engage the flat portion of said cam member when the other of said arms is thrown outwardly by centrifugal force, and means for disengaging said arm from said flat portion when the speed of said pulley is decreased.

6. A governor coupling device for transmission of power, comprising a shaft, a cam member mounted on said shaft, said member having a hub and a tubular sleeve portion, said hub having a flat portion, a pulley rotatably mounted on said sleeve portion, a governor pivotally connected to said pulley, said governor having arms, one of said arms adapted to engage the flat portion of said cam member when the other of said arms is thrown outwardly by centrifugal force, means for disengaging said arm from said flat portion when the speed of said pulley is decreased, and stop means for limiting the movement of said arms.

7. A governor coupling device for transmission of power, comprising a shaft, a cam member mounted on said shaft, said cam member having a segmental portion removed therefrom to provide a flat surface on the periphery thereof, a pulley rotatably mounted on said shaft and a movable member adapted to engage with the surface of said cam member for driving said shaft when said pulley has attained a given speed.

8. A governor coupling device for transmission of power, comprising relatively movable power transmitting members, one of said members having a segmental portion removed therefrom to provide a flat surface on the periphery thereof, and a movable member carried by the other of said members adapted to engage with the surface of said other member for effecting a driving connection between said members when one of said members has attained a given speed.

9. A governor coupling device for transmission of power, comprising relatively movable power transmitting elements, a cam member carried by one of said elements, said member having a segmental portion removed therefrom to provide a flat surface on the periphery thereof, and a movable member carried by the other of said elements adapted to engage with the surface of said cam member for effecting a driving connection between said elements when one of said elements has attained a given speed.

10. A governor coupling device for transmission of power, comprising a power transmitting element, a cam member mounted on said element, said cam member having a segmental portion removed therefrom to provide a flat surface on the periphery thereof, a power transmitting element mounted on said first mentioned element, and a movable member on said last mentioned element adapted to engage with the surface of said cam member for driving said shaft when said pulley has attained a given speed.

In witness whereof, I hereunto subscribe my name to this specification.

GEORGE L. MILLER.